United States Patent
Falk et al.

(10) Patent No.: US 9,571,276 B2
(45) Date of Patent: Feb. 14, 2017

(54) DERIVATION OF A DEVICE-SPECIFIC VALUE

(71) Applicants: Rainer Falk, Poing (DE); Andreas Mucha, München (DE)

(72) Inventors: Rainer Falk, Poing (DE); Andreas Mucha, München (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 14/700,812

(22) Filed: Apr. 30, 2015

(65) Prior Publication Data
US 2015/0319000 A1 Nov. 5, 2015

(30) Foreign Application Priority Data
Apr. 30, 2014 (DE) .......................... 10 2014 208 212

(51) Int. Cl.
*H04L 9/32* (2006.01)
*H04L 9/08* (2006.01)

(52) U.S. Cl.
CPC ........... *H04L 9/0866* (2013.01); *H04L 9/0861* (2013.01); *H04L 9/3278* (2013.01); *H04L 2209/12* (2013.01)

(58) Field of Classification Search
CPC .... H04L 9/3278; H04L 9/0861; H04L 9/0866; H04L 2209/12
See application file for complete search history.

(56) References Cited

U.S. PATENT DOCUMENTS

| | | | |
|---|---|---|---|
| 8,423,789 B1* | 4/2013 | Poo ....................... | G06F 21/602 380/44 |
| 8,622,310 B2* | 1/2014 | Besling ................. | H04L 9/3278 235/492 |
| 2007/0180261 A1* | 8/2007 | Akkermans ........ | G06K 9/00885 713/186 |
| 2009/0083833 A1* | 3/2009 | Ziola ...................... | G06F 21/31 726/2 |
| 2010/0127822 A1 | 5/2010 | Devadas | |
| 2010/0146261 A1* | 6/2010 | Talstra .................... | G06F 21/10 713/155 |
| 2010/0199103 A1* | 8/2010 | Van Rijnswou . | G11B 20/00086 713/189 |
| 2011/0055649 A1 | 3/2011 | Koushanfar et al. | |

(Continued)

FOREIGN PATENT DOCUMENTS

WO WO2007069190 A2 6/2007

OTHER PUBLICATIONS

European Office Action for related European Application No. 15157318.5-1870, dated Sep. 24, 2015, with English Translation.
(Continued)

*Primary Examiner* — Yonas Bayou
(74) *Attorney, Agent, or Firm* — Lempia Summerfield Katz LLC

(57) ABSTRACT

A method and an apparatus for deriving a device-specific value from a physical unclonable function realized on a device are provided. Categorization information items are allocated to responses derived from challenges. The categorization information items are derived from statistical variations. The device-specific value may be processed further as a key bit or as an identifier.

12 Claims, 2 Drawing Sheets

(56) References Cited

U.S. PATENT DOCUMENTS

| | | | | |
|---|---|---|---|---|
| 2011/0138173 | A1* | 6/2011 | Okuda | H04L 9/12 |
| | | | | 713/161 |
| 2013/0019105 | A1* | 1/2013 | Hussain | G06F 21/10 |
| | | | | 713/189 |
| 2014/0093074 | A1 | 4/2014 | Gotze et al. | |
| 2014/0108786 | A1* | 4/2014 | Kreft | G06F 21/71 |
| | | | | 713/156 |
| 2014/0115321 | A1* | 4/2014 | Isshiki | H04L 9/3073 |
| | | | | 713/153 |
| 2014/0140513 | A1* | 5/2014 | BrightSky | H04L 9/08 |
| | | | | 380/278 |
| 2015/0143130 | A1* | 5/2015 | Ducharme | G06F 21/73 |
| | | | | 713/189 |
| 2015/0278505 | A1* | 10/2015 | Lu | H04L 9/0866 |
| | | | | 726/19 |

OTHER PUBLICATIONS

German Search Report for related German Application No. 10 2014 208 212.9, dated Dec. 23, 2014, with English Translation.

Harsha Umesh Babu: "Reflective-Physically Unclonable Function based System for Anti-Counterfeitin," Dissertation, XP055148163, 2013.

Zhang Jin: Powerful Goodness-of-Fit and Multi-Sample Tests, A thesis submitted to the Faculty of Graduate Studies in partial Fulfillment of the requirements for the degree of Doctor of Philosophy, Graduate Programme in Statistics, XP055201953, Internet: URL:http://citeseerx.ist.psu.edu/viewdoc/download?doi=10.1.1. 427.3660&rep=rep1&type=pdf, gefunden Jul. 13, 2015.

* cited by examiner

DERIVATION OF A DEVICE-SPECIFIC VALUE

This application claims the benefit of DE 10 2014 208 212.9, filed on Apr. 30, 2014, which is hereby incorporated by reference in its entirety.

BACKGROUND

The present embodiments relate to deriving a device-specific value from a physical unclonable function.

Physical unclonable functions are known for the purpose of reliably identifying objects based on intrinsic physical properties. A physical property of an article (e.g., a semiconductor circuit) is used as an individual fingerprint in this context. A physical unclonable function has a challenge applied to the physical unclonable function and delivers a response that, when cloning the device, is meant to be ungeneratable when the same challenge is applied. A response is meant to be unpredictable and hence not able, even if the challenge is known, to be produced on another, cloned circuit. Hence, authentication may be achieved by the physical unclonable function (e.g., by virtue of a response or a value derived therefrom), such as a cryptographic key, being able to be generated only if there is access to the unaltered, unmanipulated circuit with the physical unclonable function implemented thereon.

Similarly, a physical unclonable function may be used to test whether a device or semiconductor circuit is an original product. In this case, too, a response is evaluated, for example, that may not be generated on a cloned or manipulated device or semiconductor circuit.

In the context of cryptographic security mechanisms, there is provision for the use of physical unclonable functions in order to avoid storing a cryptographic key in a memory or manually inputting the key. The production of a cryptographic key by applying a challenge to a physical unclonable function is a secure key memory.

In the context of the production of cryptographic keys and when using a physical unclonable function for checking identity or testing originality, a device-specific or hardware-specific identifier is to be provided in reproducible form.

The prior art includes physical unclonable functions or challenges that are applied to the physical unclonable function being tested in an initialization phase for their suitability for use for key derivation or authenticity testing. In this context, it is, for example, generally known practice to use a static random access memory (SRAM) physical unclonable function (PUF). An initial state of memory cell is used as a device-specific property. This requires a check to determine which memory cells are stable. Only stable cells are used for the subsequent ascertainment of a key or identifier.

The use of physical unclonable functions for producing cryptographic keys involves the use of Fuzzy Key Extractors, which use auxiliary data records to perform an error correction code method. Production of the auxiliary data is complex, and auxiliary data records that are produced are to be stored in suitable memory chips. This provides reproducible and secure generation of a cryptographic key. At the same time, the auxiliary data is to not contain a reference to the key, so that an error correction code is complex to produce.

Regardless of whether production of a device-specific cryptographic key or identifier involves the use of the raw response values from a physical unclonable function or of post-processed responses, the problem frequently arises in practice that the bit values obtained for a physical unclonable function have a bias (e.g., tend predominantly either toward bit values of 0 or toward bit values of 1). The information-theoretic entropy per data bit is thus less than 1 bit. The post-processing of responses from a physical unclonable function requires more data as input than may be attained as output. To achieve a particular level of security, a complex post-processing method is thus also provided for the entropy per data bit. If a PUF configuration has a strong tendency in the responses toward one bit value (e.g., a tendency toward 0 for the bits of a multibit response), then it is easier to guess keys, and the security of a cryptographic method is reduced. Distinction between different devices or an integrity check accordingly also requires the same bit pattern to be prevented from appearing repeatedly.

SUMMARY AND DESCRIPTION

The scope of the present invention is defined solely by the appended claims and is not affected to any degree by the statements within this summary.

The present embodiments may obviate one or more of the drawbacks or limitations in the related art. For example, simplified derivation of a device-specific value using a physical unclonable function, without the need for an error correction code method, is provided.

According to one or more of the present embodiments, a method for deriving a device-specific value from a physical unclonable function realized on a device includes ascertaining a first response from the application of a first challenge to the physical unclonable function at least once. At least one second response is ascertained from the application of a second challenge to the physical unclonable function at least once. A respective categorization information item is derived from a respective response by allocation of the respective response to one of at least two respective categories with regard to a statistical variation. A respective category is stipulated by at least one prescribable threshold value. The device-specific value is derived from at least two of the respective categorization information items.

The physical unclonable function (PUF) is used in the method without having previously checked the behavior of different responses in relation to different challenges or without having previously checked various configurations of the PUF. A PUF that initially appears unsuitable for producing a reproducible response, or a PUF for which production of a reproducible device-specific value requires an error correction code method, is also used based on the method. Regardless of a stability of a response when a challenge is applied a plurality of times or regardless of whether a response to a challenge has a bias toward 0 to toward 1, a first response is produced via a first challenge being applied to the PUF at least once. Similarly, at least one second response is produced from a second challenge. A respective categorization information item is derived from the respective response. In this case, an arbitrary response that is produced when a challenge is applied to the PUF may be used to derive a categorization information item.

A categorization information item denotes the association with one of at least two categories with regard to a statistical variation. In other words, for every stipulatable category, at least one threshold value is prescribed that stipulates the association of a response with a category when a threshold value is exceeded or undershot.

A statistical variation refers to a property of the response that is particularly not reproducible by a PUF realized on another piece of hardware and that is characteristic of a property of the hardware. In this case, particularly the response behavior of a PUF realized on a device when a single challenge is applied repeatedly in succession is specific to the hardware of the device and may not easily be produced by a cloned piece of hardware. The statistical behavior of the PUF responses is therefore the characteristic device-specific feature.

In addition, a statistical variation refers to a property of a multibit response (e.g., one including a plurality of bits). By way of example, this involves evaluation of an explicitness of the response (e.g., evaluation of the response obtained with regard to a 0/1 distribution of the binary values that the response contains). By way of example, the evaluation concerns whether the plurality of bits contained tends toward a 0 or toward a 1. In addition, the bit error distribution for multibit responses and for the application of a single challenge to the PUF, a plurality of times may be examined. The frequency or stability of arising bit patterns may thus be used for the association with a category by comparison with a threshold value for a category. The categorization information item is derived from the associated category. In this case, when there are more than two categories, a plurality of categories may also result in a common categorization information item. The categorization information item is represented particularly in binary digits (e.g., 0 or 1).

The device-specific value is derived from at least two categorization information items. By way of example, identical categorization information items that follow one another are examined for their relationship with one another. If the categorization information item changes (e.g., changes from 0 to 1 or from 1 to 0), then at least one bit of information that is processed further to form the device-specific value is obtained from the first categorization information item and the second categorization information item (e.g., from two bits). The change in the categorization information item is the information about the statistical variation, and the device-specific value is derived from the statistical behavior.

The characterization of the response with regard to a statistical variation allows the ascertainment of a device-specific value even in cases in which a reproducible device-specific value for a given configuration of a PUF may otherwise be ascertained only using an error correction code method. The evaluation of a relationship for categorization information items (e.g., within a prescribable block width or within a variable block width) meets the requirement for the device-specific value to be distributed independently and identically. This requirement for the device-specific value provides that the device-specific value is suitable for producing key bits for cryptographic keys or allows use for the integrity check on a piece of hardware.

Hence, a device-specific value, for deriving a key or an identifier, that may be produced in a secure manner only on a device with specific hardware properties provided for this purpose is produced using a resource-saving method.

More than two challenges are used. The more than two challenges are used to produce more than two responses in the manner described above. The magnitude of the number of device-specific values that is produced may thus be influenced in the method.

Depending on the level of the entropy per device-specific value, a post-processing method may usefully be connected.

According to an embodiment, the derivation of the respective categorization information item involves the respective response with regard to a stability, an explicitness, a Hamming weight or a bias being allocated to the respective category stipulated by at least one prescribable threshold value. A stability of a response is ascertained by the evaluation of a single-bit or multi-bit response (e.g., one including one bit or a plurality of bits) when an identical challenge is applied to the PUF a plurality of times. There is provision for subdivision of stability categories, and a stability is assigned to the response associated with a challenge depending on the frequency of the bit pattern that arises.

In a simple case, an explicitness of the response may provide for subdivision into the categories bias toward 0 and bias toward 1. In this case, toward 0 provides that the response has the value 0 proportionally more often than the value 1, or vice versa.

During analysis of the Hamming weight for the response, by way of example, the number of bits with the value 1 or 0 may be taken as a basis for performing allocation to one of the categories strong 0, weak 0, equal, weak 1 and strong 1. For five categories, for example, there may be four threshold values prescribed that separate the categories from one another. When a bias is ascertained, with the tendency of the response toward one of the values 0 and 1 being analyzed, there may be provision for a single threshold value that, when exceeded, indicates that there is a bias.

By way of example, the threshold value used is a statement of how many of the bits present for each response need to be a 0 or a 1. The value may similarly be indicated in the form of a percentage. If a statistical distribution of a plurality of responses when a single challenge is applied to the PUF is examined, the threshold value is embodied in the form of a statement indicating what percentage of matching bit patterns prompts the responses associated with the challenge to be identified as stable.

Depending on the response behavior of a PUF that is used, the categorization information items are ascertained based on a suitable structure of the categories.

According to an embodiment, the derivation of the device-specific value additionally includes ascertaining identical categorization information items from at least two responses to successive challenges by comparing the respective categorization information items. A sequence property of a series of identical categorization information items is ascertained.

Hence, sequences of responses with an identical categorization information item are ascertained. If associated responses with an identical categorization information item arise for successive challenges, these responses are combined to form a sequence. This involves data compression taking place. The device-specific value is ascertained from a sequence property of this sequence. In this case, a sequence may be of arbitrary length, which is determined by the next change in the categorization information item that occurs. The irreversible data compression makes inference of the responses from the device-specific value even more difficult, so that even if the challenges are known, it is not possible to derive any information about the number or properties of the responses. This increases security against misuse by PUF models, for example. In a variant, a position of changes arising in the categorization information item is used to ascertain the associated counter reading of a sequence counter of the challenge generator. In one embodiment, the counter reading that follows the change may be used in order to derive the device-specific value from the categorization information items. By way of example, the bottommost bit of the counter reading ascertained in this manner is output.

According to an embodiment, the sequence property used for the series of identical categorization information items is a least significant bit of a binary representation of a length of the series.

The sequence property used may therefore be the information about whether the length of a sequence is an even or uneven value. The bit ascertained as a sequence property may then be used directly as device-specific value. Depending on the area of application, the device-specific value ascertained from the at least two challenges and the at least two responses ascertained therefrom may be used as a bit of a cryptographic key or as a value of a bit string for checking an authenticity of a piece of hardware.

Ascertainment of the length of the series may be realized in a simple manner, and the use of the information about the least significant bit of the binary representation of the length provides irreversibility for ascertainment of the sequence property.

More than two challenges may be used. The length of the series of identical categorization information items is dependent on the next change arising in the categorization of the response. Hence, a challenge stipulates the beginning of a new, subsequent sequence when a response with another categorization information item is produced. The number of challenges required for generating a required number of device-specific values is therefore determined by the changes in the categorization information items.

According to an embodiment, the derivation of the device-specific value also involves a number of changes in the respective categorization information item within a prescribable block length of responses to successive challenges being ascertained.

Large block lengths (e.g., of 16 bits, 32 bits, 64 bits or greater), for example, prompt evaluation of how many changes in the categorization information item occur within the fixed block, whether at least one change occurs, or whether the number of changes in the categorization information item corresponds to an even or an uneven value. This also prompts data compression that is irreversible and does not allow inference of the challenge/response behavior of a PUF based on the device-specific value or the key produced therefrom to take place.

According to an embodiment, two or more categories are respectively stipulated by one or more threshold values. By prescribing a plurality of categories, the categorization information item may be derived from a pattern of characterizations. For example, in one variant, the categories strong low, weak low, equal, weak high and strong high, into which the respective response is classified depending on a Hamming weight, are stipulated. By way of example, strong low and weak low are considered to be equivalent and denote a surplus of 0 bits in the response. The equal category provides even distribution of 0 bits and 1 bits. This category is ignored for deriving the device-specific value, for example. The weak high and strong high categories accordingly represent a dominance of 1 values in a response and may accordingly be considered to be equivalent. Hence, the determination of the length of a sequence with the same characterization prompts analysis of a change between low-dominated series and high-dominated series.

In another variant, the respectively more explicit characterizations strong low and strong high are used as a starting point for the analysis. By contrast, the weak characterizations weak low and weak high are graded as ambiguous. In these cases, the device-specific value may be derived on a trial basis using both conceivable possibilities of characterization. In other words, weak characterization is replaced once with the associated strong characterization and once with an equal characterization, for testing purposes. This is repeated recursively for further sections of the series. The alternative key bits ascertained in this manner are both used to produce a cryptographic key, and this results in a plurality of key candidates. Based on encrypted test data, trial and error with the plurality of key candidates makes it possible to determine which is the correct key. In a further variant, a plurality of key candidates are sorted based on a prescribable ordering criterion. For example, the first, the last or the middle key candidate is used. In a further variant, the neighboring keys are used. A key may thus be selected from a set of key candidates based on a fixed criterion. A key may thus be determined from the set of key candidates deterministically when a key is produced for the first time, for example.

It is also possible, in the case of weak characterization, to attempt to derive the device-specific value on a trial basis using the complementary characterization (e.g., low for weak-high or high for weak-low).

In a further variant, for weak characterizations that arise, the determination of the association with the category may be repeated in order to obtain a more explicit category for the response for these challenge values, possibly in the event of a further query on the PUF. By way of example, the characterization may involve up to 16-fold repetition and checking of whether an outlier is observed for the respective strong characterization or for the equal category. For these selected, ambiguous challenge values, the categorization information item is then obtained from the repeated application of the challenge to the PUF.

According to an embodiment, the respective response is formed from a bit or from a plurality of bits. If a PUF, when a challenge is applied thereto, delivers a response that consists of one bit, repeatedly applying the identical challenge allows a multibit response to be obtained. A plurality of different challenges may be used in order to obtain a multibit response.

According to an embodiment, the respective response is ascertained from the application of the respective challenge to the physical unclonable function once or from the application of the respective, respectively identical, challenge to the physical unclonable function a plurality of times. Hence, depending on the PUF or depending on the configuration of a PUF, the response behavior is used in optimum fashion to perform the method. Even with a multibit response, a challenge may be applied to the PUF a plurality of times, particularly in order to ascertain the stability behavior.

According to an embodiment, the device-specific value is used as a key bit of a cryptographic key. Based on the methods described in the prior art, methods for producing a cryptographic key that use a PUF require the PUF, the configuration of a PUF, or the challenges used to be checked to determine that response values that have no statistical variations or no uneven distribution are delivered, which are considered to be a disturbing effect. Hence, complex error correction code methods are to be avoided. According to an embodiment, the value of the response or the categorization of information item as such is not used to form a device-specific value. Instead, the device-specific value is derived from a series of categorization information items and from statistical properties of these series. The statistical variations or uneven distributions when the respective challenge is applied to the PUF are used as a characteristic feature that is specific to the device realizing the PUF. These very behaviors of the responses, which have been considered a disturbance to date, are used for obtaining information for ascertaining a device-specific value.

Depending on the required key length, a correspondingly large number of device-specific values are produced as key bits. The required length of the challenge series is greater than the bit string for generating the key, even if a response is obtained from one challenge. If a response is produced from a plurality of challenges, the number of challenges required is correspondingly larger.

According to an embodiment, the device-specific value is used for verifying an originality of the device. A statistical property that results from the implementation of a circuit with the physical unclonable function is used as a distinguishing criterion in this case for testing the originality of the hardware circuit. The test may include the provision of a series of device-specific values as a response to a series of challenges. This series of device-specific values is shorter than the challenge series in this case owing to the data compression that takes place.

The method and the embodiments described may be used in the case of PUFs that provide a challenge space that is much larger than the length of the identifier to be produced including the device-specific values. This is the case, for example, with strong PUFs, which provide a challenge space that scales exponentially in relation to physical dimensions. Hence, the complex error correction required in the prior art is replaced by negligibly greater complexity in comparison therewith when an increased number of challenges are applied to the PUF. The hardware complexity for this method is therefore very much lower than the complexity that would be necessary in order to implement standard cryptographic post-processing methods or error correction codes.

One or more of the present embodiments also relate to an apparatus having a circuit unit having at least one physical unclonable function for deriving a device-specific value. The apparatus includes a challenge generator for producing at least two challenges, and the circuit unit for a respective response to the application of the respective challenge to the physical unclonable function. The apparatus also includes a response categorizer for deriving a respective categorization information item from a respective response by allocation of the respective response to a respective category, stipulated by at least one prescribable threshold value, with regard to a statistical variation. The apparatus includes a derivation unit for deriving the device-specific value from at least two of the respective categorization information items.

According to a development, the apparatus also includes a segmenter for ascertaining identical categorization information items for at least two responses to successive challenges by comparison of the respective categorization information item.

According to a development, the apparatus also includes a sequence length determiner for ascertaining a length of a series of identical categorization information items and determining a least significant bit of a binary representation of the length for provision as a device-specific value.

BRIEF DESCRIPTION OF THE DRAWINGS

The invention is explained in more detail below using exemplary embodiments with reference to the figures, in which.

DETAILED DESCRIPTION

Figure 1:
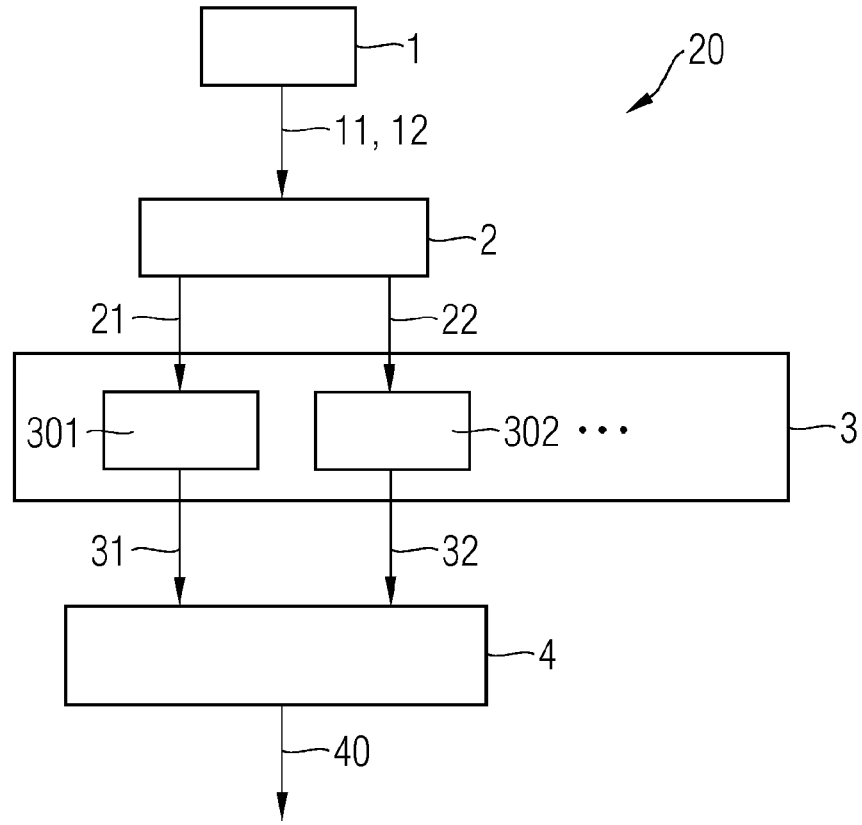
FIG. 1 shows a schematic illustration of the method for deriving a device-specific value and of the apparatus for deriving a device-specific value according to a first exemplary embodiment of the invention.

FIG. 1 shows a schematic illustration of one embodiment of an apparatus 20 including a circuit unit 2, a challenge generator 1, a response categorizer 3, and a derivation unit 4. The challenge generator 1 generates a series of challenges 11, 12 for applying the respective challenges 11, 12 from the challenge series to the physical unclonable function on the circuit 2. The challenge generator 1 produces up to several 100 challenges. For all challenges 11, 12 produced, a response 21, 22 is output by the circuit unit 2 as a response to the respective challenge 11, 12.

All response 21, 22 are then characterized. A response 21, 22 that consists of 8 bits is analyzed with regard to a bias that is existent. If the response 21 contains more than a prescribed number of 0-value bits in the 8 bits (e.g., more than 5 0 bits), the response 21 is allocated to a first category 301. If the number of 1-value bits in the response 22 exceeds a prescribed limit value, then the response 22 is classified into a second category 302. All responses 21, 22 formed are in this way allocated to one of the two categories 301, 302.

The series of categorization information items 31, 32 that have resulted from the allocation to one of the categories 301, 302 is then segmented. This involves segments or sections being formed based on a prescribed criterion. Advantageously, the identity of successive categorization information items 31, 32 is ascertained, and the length of a series of identical categorization information items is ascertained. A change takes place when two responses 21, 22 from adjacent challenges 11, 12 in the challenge series have been allocated to different categories 301, 302. The derivation specification used for the derivation of the device-specific value 40 by the derivation unit 4 is the least significant bit of a binary representation of the segment length, for example. In other words, an uneven segment length prompts the bit 1 to be obtained, and an even segment length prompts the bit 0 to be obtained, as device-specific value 40. This value is used as a key bit, and a cryptographic key is formed from a concatenation of all device-specific values that may be produced in this manner from a prescribed series of challenges.

In a second exemplary embodiment, a stability of a prescribed challenge is examined and is used for deriving a device-specific value.

Figure 2:
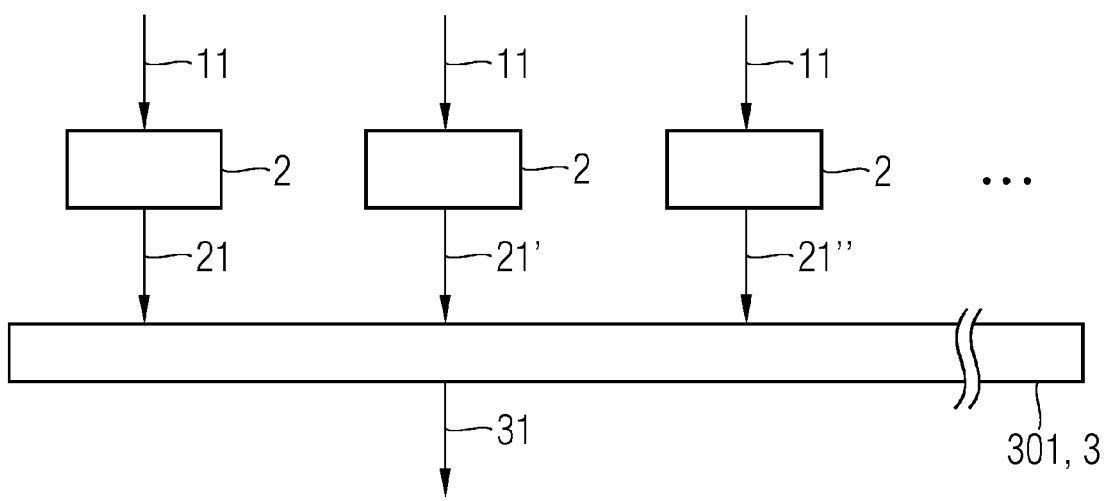
FIG. 2 shows a schematic illustration of a section of the method for deriving a device-specific value and of the apparatus for deriving a device-specific value according to a second exemplary embodiment of the invention.
Figure 3:
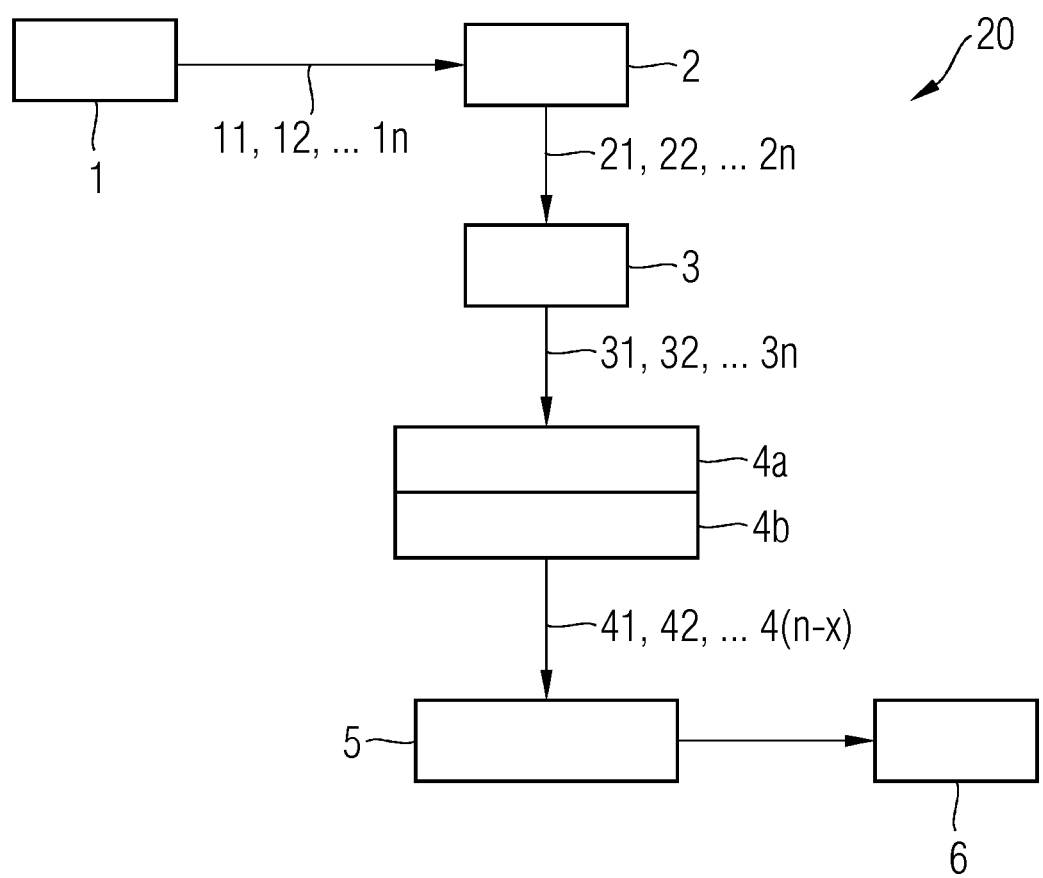
FIG. 3 shows a schematic illustration of the method for deriving a device-specific value and of the apparatus for deriving a device-specific value according to a third exemplary embodiment of the invention.

FIG. 2 shows the schematic method in which an identical challenge 11 is repeatedly applied to a physical unclonable function in order to obtain a categorization information item 31 from the responses 21, 21', 21" obtained from the challenge. If, as a result of the circuit unit 2 being repeatedly queried with the same challenge value 11, the challenge 11 used is identified as stable by a response categorizer 3 because there is a match in a stipulatable percentage of the ascertained responses, then the responses 21, 21', 21" are allocated to a first category 301. By way of example, 80% of the responses obtained are to have a match in order to be allocated to the first category 301 as stable responses. In this way, a set of responses that leads to a categorization information item 31 is formed for the challenge 11.

According to a third exemplary embodiment, a segmenter 4a and a sequence length determiner 4b are provided as part of an apparatus 20 for the purpose of performing the method of one or more of the present embodiments.

A challenge generator 1 delivers, for the purpose of illustration, 9 challenges, for example, to a circuit unit 2 with PUF challenges 11, 12, . . . 1n situated thereon. The value is in the order of magnitude of several 100 or 1000 challenges. The PUF is used to produce responses 21, 22, . . . 2n from the challenges 11, 12, . . . 1n. The responses are allocated appropriate categorization information items 31, 32, . . . 3n by a response categorizer 3 according to one of the variants described above.

The segmenter 4a ascertains identical categorization information items 31, 32, . . . 3n from the 9 responses to successive 9 challenges by comparing the respective categorization information item. By way of example, the segmenter ascertains 4 segments in this case (e.g., 3 changes arising within the series of 9 responses). A sequence length determiner 4b ascertains a length of a series of identical categorization information items (e.g., a segment length). By way of example, the lengths 3, 2, 3 and 1 are thus obtained for the 4 segments. These are used by the sequence length determiner 4b to determine the respective least significant bit of a binary representation of the respective length. In the example shown, the values 1, 0, 1, 1 are thus obtained as key bits. These bits are each a device-specific value 41, 42, . . . (n–x). In the example described, four device-specific values are thus ascertained. Normally, and as a basis for sufficiently great entropy, the number n–x of device-specific values 41, 42, . . . (n–x) produced in this way is much smaller than the number n of responses 21, 22, . . . 2n.

A 64-bit key is produced by a key generator 5 by concatenating the individual device-specific values 41, 42, . . . (n–x). This requires a sufficiently large number of responses 21, 22, . . . 2n and accordingly of challenges 11, 12, . . . 1n. For the purpose of storing the key, the apparatus 20 also includes a key memory 6 that is a volatile memory that loses memory content without a supply of power. This may be a register including D-type flipflops or an SRAM memory.

The method and the apparatus use a circuit unit with a physical unclonable function situated thereon for key generation or for authenticity testing in a particularly simple manner. The hardware complexity is particularly low for this, and complex cryptographic post-processing methods or error correction codes for providing a reconstructable key or for avoiding false alarms during authenticity testing are advantageously avoided.

The respective apparatus parts (e.g., the challenge generator, response categorizer, derivation unit, segmenter or sequence length determiner) may be implemented in hardware and/or also in software. In the case of a hardware implementation, the respective device may be in the form of part of a computer or in the form of a microprocessor or part of a microprocessor, for example. In the case of a software implementation, the respective device may be in the form of a computer program product, in the form of a function, in the form of a routine, in the form of part of a program code or in the form of an executable object.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for producing a key bit for a cryptographic key, the producing comprising deriving a device-specific value from a physical unclonable function realized on a circuit unit, the method comprising:
    ascertaining a first response from application of a first challenge to the physical unclonable function on the circuit unit at least once;
    ascertaining at least one second response from application of a second challenge to the physical unclonable function at least once;
    deriving, by a processor, a respective categorization information item from a respective response, the deriving comprising allocating the respective response to one of at least two respective categories with regard to a statistical variation, the at least two respective categories being stipulated by at least one prescribable threshold value;
    deriving, by the processor, the device-specific value from at least two of the respective categorization information items, the deriving comprising ascertaining identical categorization information items from at least two responses to successive challenges, the ascertaining of the identical categorization information items comprising comparing the respective categorization information item, the deriving further comprising ascertaining a sequence property of a series of identical categorization information items; and
    producing, by the processor, a key bit of a cryptographic key based on the device-specific value.

2. The method of claim 1, wherein deriving the respective categorization information item involves the respective response with regard to a stability, an explicitness, a Hamming weight or a bias being allocated to the respective category stipulated by at least one prescribable threshold value.

3. The method of claim 2, wherein the sequence property used for the series of identical categorization information items is a least significant bit of a binary representation of a length of the series.

4. The method of claim 3, wherein deriving the device-specific further comprises ascertaining a number of changes in the respective categorization information item within a prescribable block length of responses to successive challenges.

5. The method of claim 1, wherein the sequence property used for the series of identical categorization information items is a least significant bit of a binary representation of a length of the series.

6. The method of claim 1, wherein deriving the device-specific further comprises ascertaining a number of changes in the respective categorization information item within a prescribable block length of responses to successive challenges.

7. The method of claim 1, wherein two or more categories are respectively stipulated by one or more threshold values.

8. The method of claim 1, wherein the respective response of the first response and the at least one second response is formed from a bit or from a plurality of bits.

9. The method of claim 1, wherein the respective response of the first response and the at least one second response is ascertained from the application of the respective challenge of the first challenge and the second challenge to the physical unclonable function once or from the application of the respective challenge to the physical unclonable function a plurality of times.

10. The method of claim 1, wherein the device-specific value is used for verifying an authenticity of the circuit unit.

11. An apparatus for producing a key bit for a cryptographic key, the apparatus comprising:
   a processor configured to produce at least two challenges; and
   a circuit unit comprising at least one physical unclonable function for deriving a device-specific value, the circuit unit being configured to produce a respective response when a respective challenge of the at least two challenges is applied to the physical unclonable function on the circuit unit,
   wherein the processor is further configured to:
      derive a respective categorization information item from a respective response by allocation of the respective response to a respective category, stipulated by at least one prescribable threshold value, with regard to a statistical variation;
      derive the device-specific value from at least two of the respective categorization information items, the derivation of the device-specific value comprising ascertainment of identical categorization information items from at least two responses to successive challenges, the ascertainment of the identical categorization information items comprising a comparison of the respective categorization information item, the derivation of the device-specific value further comprising ascertainment of a sequence property of a series of identical categorization information items; and
   produce a key bit of a cryptographic key based on the device-specific value.

12. The apparatus of claim 11, wherein the processor is further configured to:
   ascertain a length of a series of identical categorization information items; and
   determine a least significant bit of a binary representation of the length for provision as the device-specific value.

* * * * *